US009182259B2

(12) United States Patent
Suzuki et al.

(10) Patent No.: US 9,182,259 B2
(45) Date of Patent: Nov. 10, 2015

(54) ULTRASONIC FLOW METER

(71) Applicant: SMC Corporation, Chiyoda-ku (JP)

(72) Inventors: Takamitsu Suzuki, Joso (JP); Akinori Nagata, Moriya (JP)

(73) Assignee: SMC CORPORATION, Chiyoda-ku (JP)

( * ) Notice: Subject to any disclaimer, the term of this patent is extended or adjusted under 35 U.S.C. 154(b) by 30 days.

(21) Appl. No.: 14/265,488

(22) Filed: Apr. 30, 2014

(65) Prior Publication Data

US 2015/0082912 A1   Mar. 26, 2015

(30) Foreign Application Priority Data

Sep. 24, 2013   (JP) ................................ 2013-196612

(51) Int. Cl.
*G01F 1/66* (2006.01)

(52) U.S. Cl.
CPC *G01F 1/66* (2013.01); *G01F 1/662* (2013.01); *G01F 1/667* (2013.01)

(58) Field of Classification Search
CPC ....................................................... G01F 1/66
USPC ................ 73/861.25, 861.28, 861.31, 861.29
See application file for complete search history.

(56) References Cited

U.S. PATENT DOCUMENTS

| 4,365,518 | A | * | 12/1982 | Zacharias, Jr. ............. 73/861.31 |
| 5,458,004 | A | | 10/1995 | Van Der Pol |
| 5,969,263 | A | * | 10/1999 | Ligneul et al. ............. 73/861.25 |
| 6,820,500 | B2 | * | 11/2004 | Wilda ........................ 73/861.29 |
| 7,673,527 | B2 | * | 3/2010 | Ehring et al. ............... 73/861.28 |
| 2007/0227263 | A1 | | 10/2007 | Fukano et al. |

FOREIGN PATENT DOCUMENTS

| CN | 101672672 A | 3/2010 |
| JP | 3-193105 | 8/1991 |
| JP | 2793133 | 9/1998 |
| JP | 2000-074718 A | 3/2000 |
| JP | 2004-205475 | 7/2004 |
| JP | 2007-263796 A | 10/2007 |
| JP | 2010-243245 | 10/2010 |

OTHER PUBLICATIONS

Office Action issued Aug. 5, 2014 in Japanese Patent Application No. 2013-196612 (with partial English translation).
Japanese Office Action issued Jan. 20, 2015, in Japan Patent Application No. 2013-196612 (with partial English translation).
Taiwanese Office action issued Jan. 21, 2015, in Taiwan Patent application No. 103120671 (with partial English translation).

* cited by examiner

*Primary Examiner* — Jewel V Thompson
(74) *Attorney, Agent, or Firm* — Oblon, McClelland, Maier & Neustadt, L.L.P.

(57) ABSTRACT

An ultrasonic flow meter is equipped with a housing through which a liquid flows, and a pair of detection units disposed on opposite ends of the housing and including acoustic wave transmitting and receiving units capable of transmitting and receiving acoustic wave signals. Vibration generating mechanisms having vibration generating bodies arranged perpendicularly to the detection units are disposed on an outer circumferential side of the housing. In addition, when the flow rate of the liquid that flows through the housing is measured, the vibration generating bodies are energized and made to vibrate, such that gas bubbles, which adhere to cover members in contact with the liquid and that cover the acoustic wave transmitting and receiving units, are removed by the vibrations.

8 Claims, 3 Drawing Sheets

ULTRASONIC FLOW METER

CROSS-REFERENCE TO RELATED APPLICATION

This application is based upon and claims the benefit of priority from Japanese Patent Application No. 2013-196612 filed on Sep. 24, 2013, the contents of which are incorporated herein by reference.

BACKGROUND OF THE INVENTION

1. Field of the Invention

The present invention relates to an ultrasonic flow meter for detecting the flow rate of a liquid based on a propagation velocity difference when acoustic waves are propagated through the liquid.

2. Description of the Related Art

Heretofore, an ultrasonic flow meter has been known in which, for example, paired transducers are arranged respectively on an upstream side and a downstream side of a conduit through which a liquid flows. Ultrasonic waves transmitted from one of the transducers are reflected by an inner wall surface of the conduit and are received by another of the transducers, and a flow velocity or a flow rate of the liquid is measured based on a difference in propagation velocities of the ultrasonic waves.

In such an ultrasonic flow meter, for example as disclosed in Japanese Patent No. 2793133 (Patent Document 1), a measurement conduit is provided having a supply pipe to which the liquid is supplied and a discharge pipe from which the liquid is discharged. Further, a first measurement head is disposed on one end of the measurement conduit, and a second measurement head is disposed on another end of the measurement conduit.

The first and second measurement heads are constituted to function as acoustic wave emitters or acoustic wave receivers. For example, a pulse shaped acoustic wave signal is transmitted from the first measurement head, and the second measurement head receives the acoustic wave signal as an acoustic wave receiver. Next, the first measurement head is switched to operate as a receiver, and by reception thereon of an acoustic wave signal transmitted from the second measurement head, the flow rate of the liquid is measured based on a difference in the propagation velocities of the acoustic waves.

However, with the ultrasonic flow meter according to the above-described conventional technique, a structure is provided in which the liquid supplied to the supply pipe is changed in direction substantially perpendicularly, whereupon the liquid then flows to the measurement conduit. Therefore, by the sudden change in the flow direction of the liquid, a pressure change occurs resulting in turbulence, so that air entrained in the liquid forms gas bubbles in the liquid, whereby such gas bubbles adhere to the inner wall surface of the measurement conduit, which is disposed in confronting relation to the first and second measurement heads. Due to adhesion of such gas bubbles, the gas bubbles interfere with propagation of the acoustic wave signals, leading to deterioration in the accuracy with which the flow rate of the liquid is measured.

Thus, with the aim of preventing adhesion of gas bubbles as described above, in the ultrasonic flow meter disposed in Japanese Laid-Open Patent Publication No. 2010-243245 (Patent Document 2), surface processing is carried out on an inner circumferential surface of a measurement tube through which a liquid flows, such that wettability is increased upon flowing of the liquid, and together therewith, adherence of gas bubbles with respect to the inner circumferential surface is prevented.

SUMMARY OF THE INVENTION

However, with the ultrasonic flow meter according to Patent Document 2, there is a concern that the processing solution used for carrying out surface processing may become eluted into the liquid. Thus, for example, in the case that measurement of the flow rate is used for a chemical solution or pure water, which is used in a semiconductor manufacturing apparatus, there is a fear that contamination may occur with respect to the liquid to be measured.

A general object of the present invention is to provide an ultrasonic flow meter in which, by reliably preventing the adherence of gas bubbles, acoustic wave signals can be made to propagate reliably, and the flow rate of a liquid can be measured with high precision, together with preventing contamination of the liquid.

The present invention is an ultrasonic flow meter that measures a flow rate of a liquid based on acoustic wave signals, comprising a casing constituted from a pair of ports through which a liquid is supplied and discharged, and a conduit having a passage connected between the ports, wherein the liquid flows in the interior of the passage, and a pair of detection units capable of transmitting and receiving the acoustic wave signals, the detection units being disposed on opposite ends of the casing in mutual confronting relation to each other and sandwiching the passage therebetween, wherein the detection units are disposed on an axis of the conduit, and on outer circumferential sides of the detection units, vibration generating mechanisms are provided that impart vibrations with respect to the detection units.

According to the present invention, in an ultrasonic flow meter in which a pair of detection units are disposed in the interior of a casing, the detection units are disposed on the axis of a conduit in the casing, and on the outer circumferential sides of the detection units, vibration generating mechanisms are provided that impart vibrations with respect to the detection units. In addition, when liquid flows through the ports and through the interior of the passage, even in the case that gas bubbles, which have entered from the ports, or gas bubbles that are generated in the liquid become adhered with respect to the detection units, by causing the vibration generating mechanisms to generate vibrations and to impart such vibrations to the detection units, the gas bubbles are flicked off from the detection units and can be removed. As a result, propagation of acoustic wave signals is not disturbed by adherence of gas bubbles, and since transmission and reception of acoustic wave signals can reliably be performed by the detection units, the flow rate of the liquid can be measured with high accuracy based on the acoustic wave signals. Further, since the gas bubbles are reliably removed without effecting surface processing, which is performed in the ultrasonic flow meter according to the conventional technique, on the casing or the like through which the liquid flows, elution of a processing solution used for carrying out such surface processing, into the liquid can be prevented, and even in the case that pure water or a chemical solution is used as the liquid to be measured, contamination of the liquid does not occur.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
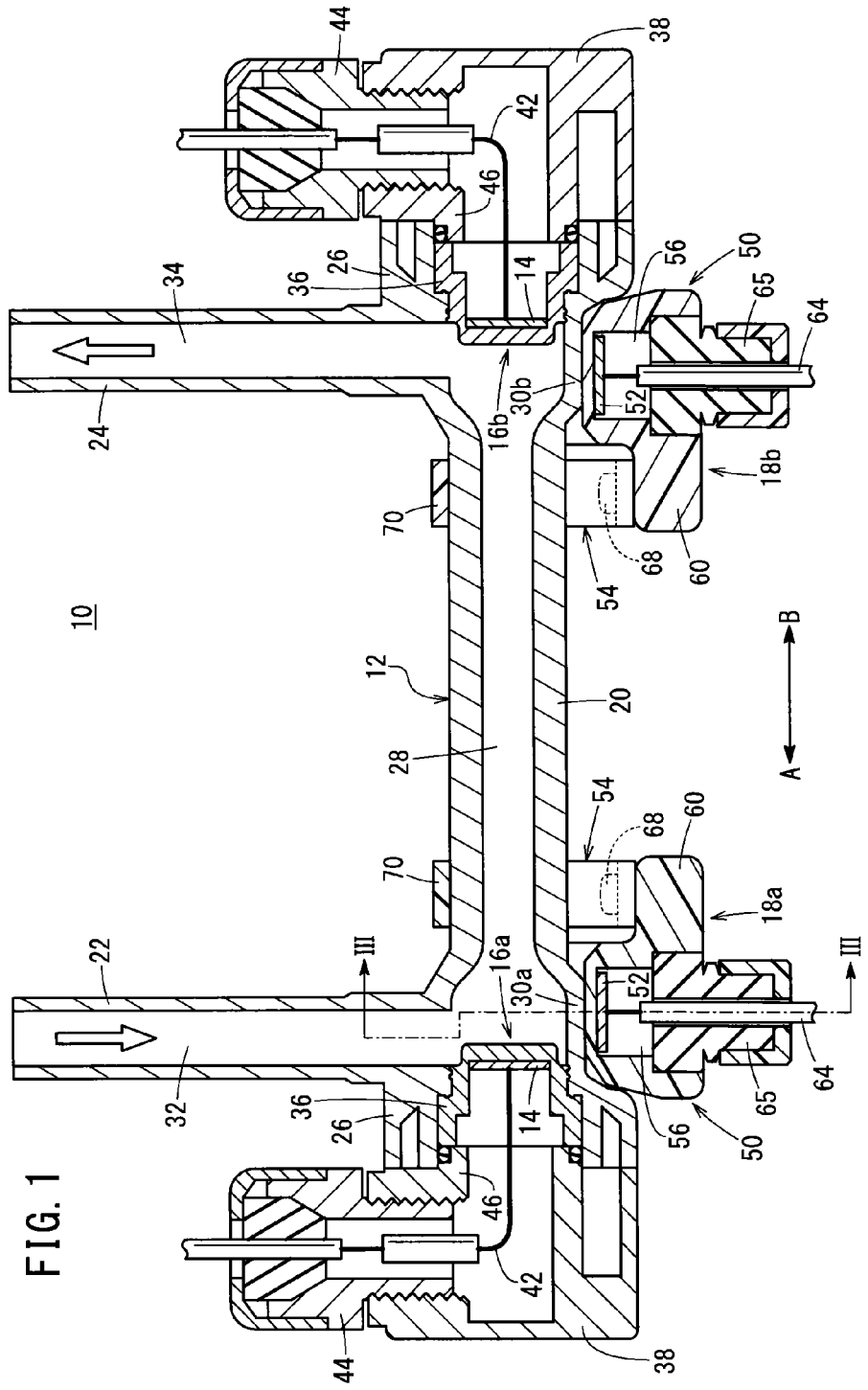
FIG. 1 is an overall cross sectional view of an ultrasonic flow meter according to an embodiment of the present invention.

As shown in FIG. 1, an ultrasonic flow meter 10 according to an embodiment of the present invention includes a housing (casing) 12 having a passage 28 therein to which a fluid such as, for example, water, a chemical solution or the like, is supplied, a pair of detection units 16a, 16b disposed on opposite ends of the housing 12 and in which acoustic wave transmitting and receiving units 14 for transmitting and receiving acoustic wave are incorporated, and a pair of vibration generating mechanisms 18a, 18b, which are provided at positions on outer circumferential sides of the detection units 16a, 16b.

The housing 12 comprises a conduit 20, which is formed in a straight line, for example, from a metallic material such as stainless steel or the like, a supply portion (port) 22, which is connected substantially perpendicular to one end of the conduit 20, and a discharge portion (port) 24, which is connected substantially perpendicular to the other end of the conduit 20. The supply portion 22 and the discharge portion 24 are disposed substantially in parallel. Further, the housing 12 is not limited to the case of being made from a metallic material, and may be formed from a resin material.

Connection flanges 26, to which the detection units 16a, 16b are connected, are formed so as to expand radially outward in diameter on opposite end portions of the conduit 20, and the passage 28 through which the liquid flows is formed in an axial direction (the direction of arrows A and B) in the interior of the conduit 20. On opposite ends of the passage 28, a pair of expanded diameter portions 30a, 30b, which open to the exterior and are expanded in diameter gradually toward the vicinity of the opposite ends, are formed respectively.

More specifically, the expanded diameter portions 30a, 30b are disposed in the interiors of the respective connection flanges 26, and the detection units 16a, 16b are disposed respectively in confronting relation to the expanded diameter portions 30a, 30b. Further, the supply portion 22 and the discharge portion 24 are connected on outer circumferential sides of the expanded diameter portions 30a, 30b, respectively.

A supply passage 32, which penetrates in the axial direction, is formed in the interior of the supply portion 22. One end part of the supply passage 32 opens, and the other end part thereof communicates with the expanded diameter portion 30a, which is formed on one end side (in the direction of the arrow A) of the conduit 20. On the other hand, a discharge passage 34, which penetrates in the axial direction, is formed in the interior of the discharge portion 24. One end part of the discharge passage 34 opens, and the other end part thereof communicates with the expanded diameter portion 30b, which is formed on the other end side (in the direction of the arrow B) of the conduit 20. More specifically, since the supply passage 32 and the discharge passage 34 communicate mutually through the passage 28 including the pair of expanded diameter portions 30a, 30b, the liquid, which is supplied to the supply passage 32 from a non-illustrated liquid supply source, flows through the passage 28 and then is discharged to the exterior from the discharge passage 34.

Moreover, pipes such as non-illustrated tubes or the like, for example, are connected respectively to ends of the supply portion 22 and the discharge portion 24.

Figure 2A:
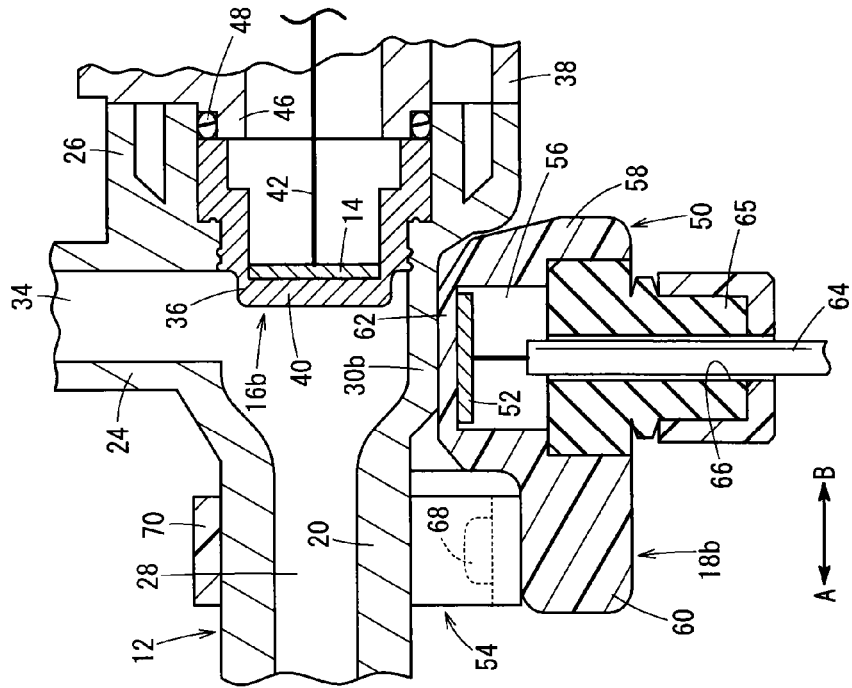
FIG. 2A is an enlarged cross sectional view showing the vicinity of a vibration generating mechanism on a supply side in the ultrasonic flow meter of FIG. 1.
Figure 2B:
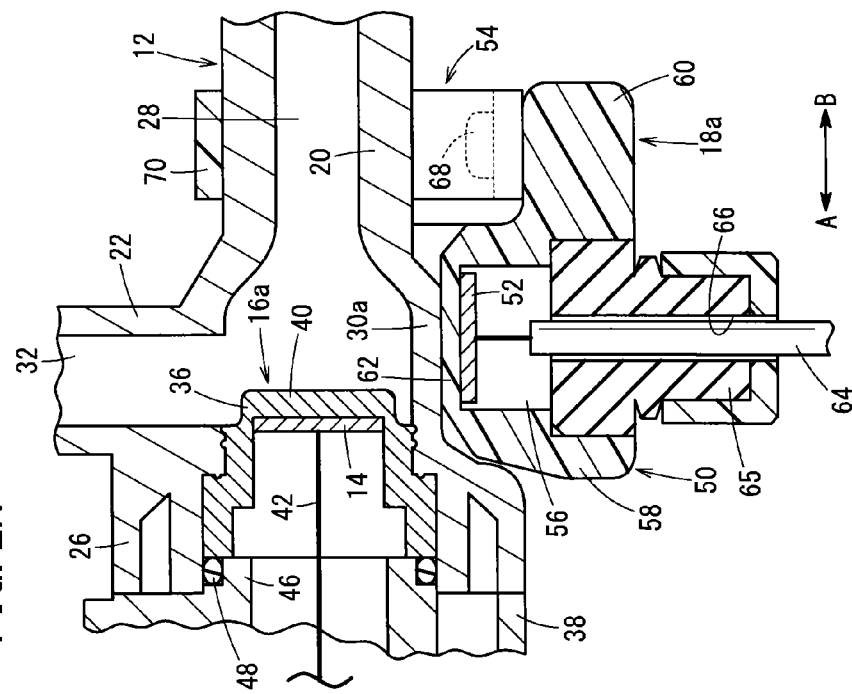
FIG. 2B is an enlarged cross sectional view showing the vicinity of a vibration generating mechanism on a discharge side in the ultrasonic flow meter of FIG. 1.

As shown in FIGS. 1 and 2B, the detection units 16a, 16b are disposed respectively in the expanded diameter portions 30a, 30b of the housing 12. The detection units 16a, 16b include cover members (liquid contacting portions) 36, which are mounted in confronting relation to the passage 28 of the housing 12, the acoustic wave transmitting and receiving units 14, which are disposed in the interiors of the cover members 36, and connecting caps 38, which are connected to the connection flanges 26 of the conduit 20 and seal the open expanded diameter portions 30a, 30b.

Each of the cover members 36 is formed, for example, from a resin material having a bottomed cylindrical shape with a U-shape in cross section. Open ends of the cover members 36 are arranged on the side of the connecting caps 38, whereas the other ends thereof, which are arranged in facing relation to the passage 28, are formed in a bottomed shape. The other ends of the cover members 36 include bottom wall portions 40, which project in substantially flat shapes toward the passage 28 so as to be perpendicular, with the acoustic wave transmitting and receiving units 14 being disposed respectively on inner wall surfaces thereof (see FIGS. 2A and 2B).

More specifically, the cover members 36 are disposed so as to be in contact with the liquid on end surfaces of the bottom wall portions 40 that face toward the passage 28, such that by covering the acoustic wave transmitting and receiving units 14, which are accommodated in the interiors of the cover members 36, the cover members 36 serve to isolate the acoustic wave transmitting and receiving units 14 from the liquid.

Further, as shown in FIG. 1, the bottom wall portion 40 of one of the cover members 36 and the bottom wall portion 40 of the other of the cover members 36 are disposed in confronting relation to each other sandwiching the passage 28 therebetween.

The acoustic wave transmitting and receiving units 14 are constituted from piezoelectric elements (piezo elements), which are formed, for example, in plate-like shapes, and are mounted, respectively, on the bottom wall portions 40 of the flat cover members 36. Conductive wires 42 are connected as a pair, respectively, to the acoustic wave transmitting and receiving units 14. The conductive wires 42, after being guided into the interiors of the connecting caps 38, are directed out to the exterior through sealing bolts 44, which are screw-engaged in the connecting caps 38.

The connecting caps 38 are connected through a plurality of bolts (not shown) with respect to the connection flanges 26 of the housing 12, and fitting portions 46 are formed to project on side portions of the connecting caps 38. The fitting portions 46 are fitted by insertion into the expanded diameter portions 30a, 30b of the housing 12. Further, the conductive wires 42, which are connected to the acoustic wave transmitting and receiving units 14, are inserted through and into the interior of the fitting portions 46. As a result, the acoustic wave transmitting and receiving units 14 are sealed in the interiors of the expanded diameter portions 30a, 30b by the connecting caps 38, which are connected with respect to the connection flanges 26 of the housing 12. The acoustic wave transmitting and receiving units 14 can be removed from the housing 12 by disengagement of the connecting caps 38.

Further, seal members 48, which are mounted on outer circumferential surfaces of the fitting portions 46, are placed in abutment against inner circumferential surfaces of the expanded diameter portions 30a, 30b, so that an airtight condition between the connecting caps 38 and the housing 12 is maintained.

Furthermore, the sealing bolts 44, in which conductive wires 42 are held, are screw-engaged into upper end portions of the connecting caps 38, for thereby sealing the interiors of the connecting caps 38. In addition, the conductive wires 42, which are led out to the exterior through the sealing bolts 44, are connected respectively to a non-illustrated controller. Reception signals, which are received by the acoustic wave transmitting and receiving units 14, are output with respect to the controller via the conductive wires 42.

Figure 3:
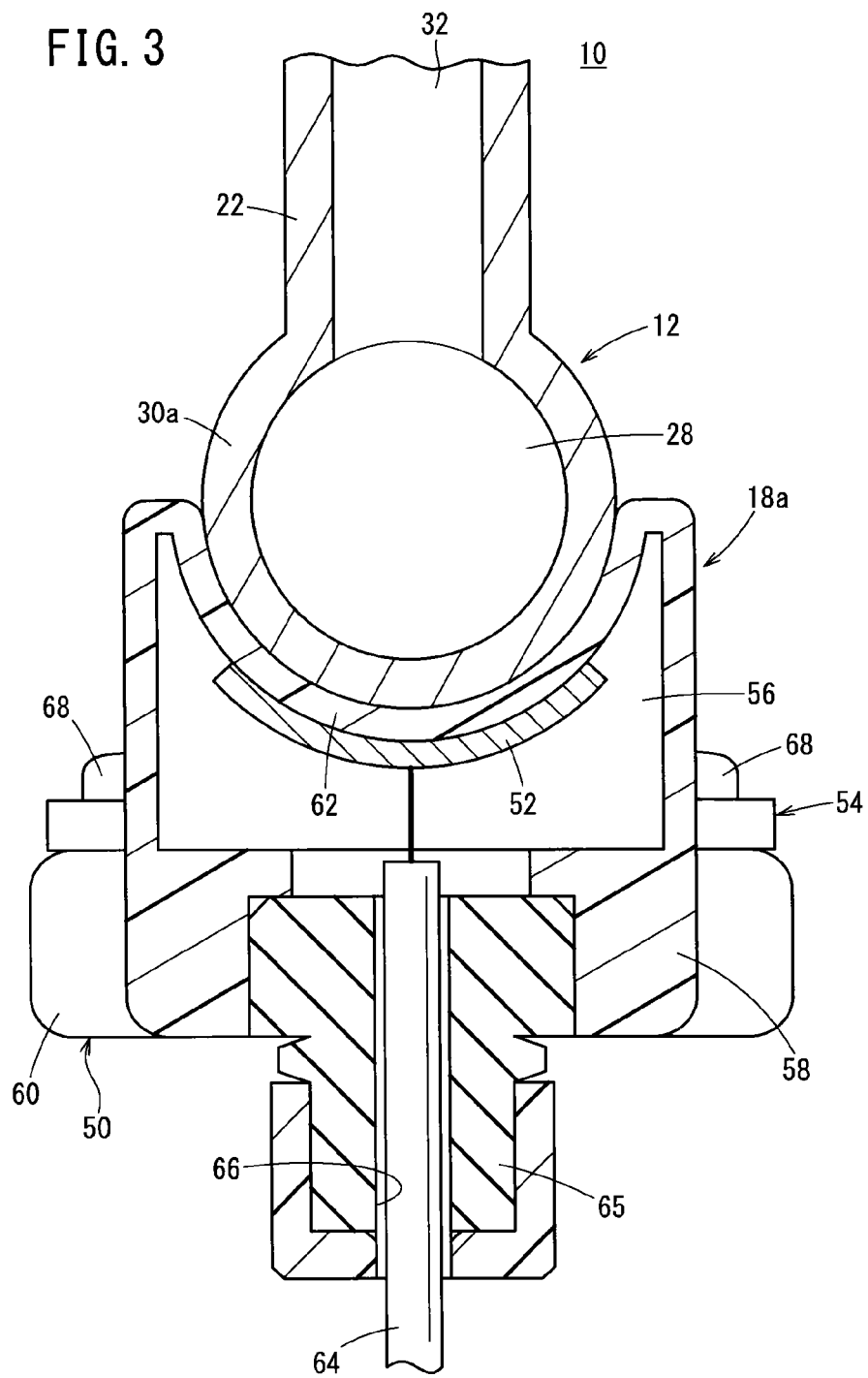
FIG. 3 is a cross sectional view taken along line III-III of FIG. 1.

As shown in FIGS. 1 through 3, the vibration generating mechanisms 18a, 18b include casings 50, which are disposed respectively on outer circumferential sides of the pair of expanded diameter portions 30a, 30b on the housing 12 and are disposed on the outer circumferential side of the housing 12, vibration generating bodies 52 accommodated in the interiors of the casings 50, and brackets 54 for securing the casings 50 with respect to the housing 12. The vibration generating mechanisms 18a, 18b are constituted in the same manner, respectively, as a pair of vibration generating mechanisms 18a, 18b.

The casings 50 comprise, for example, base portions 58 having accommodating chambers 56 defined in the interiors thereof, and flanges 60 that project from sides of the base portions 58, such that the flanges 60 extend in directions substantially perpendicular to the axis of the accommodating chambers 56. Ends of the base portions 58 include respective retaining walls 62, which abut against outer circumferential surfaces of the expanded diameter portions 30a, 30b of the housing 12. As shown in FIG. 3, the retaining walls 62 are formed into circular-arc-like shapes in cross section, such that the cross section is substantially the same as the cross section of the outer circumferential surfaces of the expanded diameter portions 30a, 30b. One of the retaining wall 62 and the supply portion 22 are arranged along a substantially straight line with the expanded diameter portion 30a interposed therebetween while the other retaining wall 62 and the discharge portion 24 are arranged along a substantially straight line with the expanded diameter portion 30b interposed therebetween.

More specifically, the conduit 20 of the housing 12 and the accommodating chambers 56 in which the vibration generating mechanisms 18a, 18b are accommodated are arranged substantially perpendicular to each other.

Further, in the interior of each of the base portions 58, the accommodating chamber 56 is formed to extend from one end having the retaining walls 62 to the other end. Ends of the accommodating chambers 56 are sealed by the retaining walls 62, whereas the open other ends thereof are sealed by sealing plugs 65, which are mounted such that the vibration generating bodies 52 are housed inside the accommodating chambers 56.

The vibration generating bodies 52 are made up from piezoelectric elements (piezo elements) formed in plate-like shapes, for example, which are accommodated in the accommodating chambers 56 of the casings 50, and are mounted on inner wall surfaces of the retaining walls 62. More specifically, the vibration generating bodies 52 are mounted while being bent with circular-arc-like shapes in cross section corresponding to the retaining walls 62, which are formed similarly with circular-arc-like shapes in cross section. As a result, as shown in FIGS. 2A and 2B, the vibration generating bodies 52 are disposed substantially perpendicular with respect to the acoustic wave transmitting and receiving units 14 disposed in the interior of the housing 12, and are arranged at positions on outer circumferential sides of the acoustic wave transmitting and receiving units 14.

Further, cables 64 are connected respectively to the vibration generating bodies 52. After the cables 64 have been inserted through insertion holes 66 of the sealing plugs 65 that seal the accommodating chambers 56 and are led out to the exterior, the cables 64 are connected electrically to a non-illustrated controller. In addition, by applying signal voltages to the vibration generating bodies 52 via the cables 64 from the non-illustrated controller, strains are generated in the vibration generating bodies 52 by which vibrations are generated in the vibration generating bodies 52.

The brackets 54 are connected through bolts 68 to the flanges 60 of the casings 50, and include annular parts 70 for retaining the conduit 20 of the housing 12. Additionally, in a condition in which the conduit 20 of the housing 12 is inserted through the annular parts 70 of the brackets 54, the brackets 54 are fastened to the flanges 60 of the casings 50, whereby the base portions 58 are placed in abutment against outer circumferential surfaces of the expanded diameter portions 30a, 30b, and the vibration generating mechanisms 18a, 18b are fixed with respect to the housing 12 at predetermined positions in which the vibration generating bodies 52 confront the acoustic wave transmitting and receiving units 14, respectively.

Accordingly, the vibration generating mechanisms 18a, 18b are disposed detachably with respect to the housing 12 through the brackets 54. Thus, for example, in the event that a malfunction occurs in the vibration generating mechanisms 18a, 18b, the vibration generating mechanisms 18a, 18b can easily be replaced with other new vibration generating mechanisms.

In addition, by application of voltages from the non-illustrated controller to the vibration generating bodies 52 of the vibration generating mechanisms 18a, 18b, the vibration generating bodies 52 are subjected to strains, accompanied by the vibration generating bodies 52 being vibrated rapidly, and such vibrational waves are transmitted to the housing 12 and the cover members 36 through the casings 50.

The ultrasonic flow meter 10 according to the embodiment of the present invention is constructed basically as described above. Next, operations and effects of the ultrasonic flow meter 10 will be described. A liquid is supplied to the supply passage 32 through piping from a non-illustrated liquid supply source, and the liquid passes from the supply passage 32, through the passage 28, and to the discharge passage 34.

In the ultrasonic flow meter 10, acoustic wave signals are transmitted, for example, from the acoustic wave transmitting and receiving unit 14 of the detection unit 16a connected to one end of the housing 12, the acoustic wave signals propagate inside the liquid while being reflected by the inner wall surface of the passage 28, and are received by the acoustic wave transmitting and receiving unit 14 of the detection unit 16b connected to the other end of the housing 12. In this case, the acoustic wave signals propagate along the flow direction of the liquid (the direction of the arrow B in FIG. 1).

Further, in a reverse manner, acoustic wave signals are transmitted from the acoustic wave transmitting and receiving unit 14 of the detection unit 16b connected to the other end of the housing 12, and the acoustic wave signals are received by the acoustic wave transmitting and receiving unit 14 of the detection unit 16a connected to the one end of the housing 12. In this case, the acoustic wave signals propagate along a direction opposite to the flow direction of the liquid (the direction of the arrow A in FIG. 1).

In addition, reception signals based on the acoustic wave signals, which are received by the acoustic wave transmitting and receiving units 14, are output to the non-illustrated controller through the conductive wires 42. A propagation time difference ΔT is calculated from the detection signals by the controller, not shown, based on a propagation time T1 for the case in which the acoustic wave signals were propagated in the flow direction of the liquid (in the direction of the arrow B), and a propagation time T2 for the case in which the acoustic wave signals were propagated in the direction opposite to the flow direction of the liquid (in the direction of the arrow A). A flow velocity V, i.e., a flow rate, of the liquid is calculated from the propagation time difference ΔT.

In this case, although gas bubbles, which are introduced together with the liquid from the supply passage 32, or gas bubbles entrained in the liquid tend to adhere to the cover members 36 constituting the detection units 16a, 16b, by applying signal voltages from the non-illustrated controller with respect to the vibration generating bodies 52 of the vibration generating mechanisms 18a, 18b, the vibration generating bodies 52, which are made up from piezoelectric elements, are subjected to strains and generate vibrations, and the vibrational waves are transmitted to the cover members 36 through the casings 50 and the housing 12. Consequently, the gas bubbles are flicked off and are made to separate away from the cover members 36 by the vibrational waves, and the gas bubbles move downstream together with the liquid and are discharged to the exterior from the discharge passage 34.

Owing thereto, by removal of the gas bubbles that adhere to the cover members 36 under operation of the vibration generating mechanisms 18a, 18b, propagation of the acoustic wave signals is not hindered, and transmission and reception of acoustic wave signals in the ultrasonic flow meter 10 can suitably be carried out. As a result, based on the acoustic wave signals, the flow rate of the liquid can be measured with high accuracy.

Further, since the gas bubbles that adhere to the cover members 36 are removed by way of the vibrational waves generated by the vibration generating mechanisms 18a, 18b, there is no need to perform surface processing using a processing solution on inner wall surfaces of the measurement conduit as in the ultrasonic flow meter according to the conventional technique. Thus, for example, contamination caused by elution of the processing solution into a chemical solution or pure water, which is used in a semiconductor manufacturing apparatus, can reliably be prevented.

Furthermore, the vibration generating mechanisms 18a, 18b are mounted detachably through the brackets 54, respectively, to the expanded diameter portions 30a, 30b of the housing 12, whereby a replacement operation of the vibration generating mechanisms 18a, 18b can easily be performed simply by removing the brackets 54 from the expanded diameter portions 30a, 30b. Thus, for example, in the event that a malfunction occurs in the vibration generating mechanisms 18a, 18b, the vibration generating mechanisms 18a, 18b can easily and quickly be replaced with other new vibration generating mechanisms.

Further still, by providing the vibration generating bodies 52 on outer circumferential sides of the cover members 36, and by arranging the vibration generating bodies 52 substantially perpendicularly with respect to the detection units 16a, 16b, vibrational waves generated by the vibration generating bodies 52 are transmitted effectively to the cover members 36, thereby enabling the adhered gas bubbles to be removed.

Still further, by constructing the vibration generating bodies 52 from piezoelectric elements, generation of vibrations and removal of gas bubbles can be carried out easily and inexpensively.

Further, by providing the vibration generating mechanisms 18a, 18b, even with a structure in which the supply portion 22 and the discharge portion 24 are formed substantially perpendicular with respect to the conduit 20, and gas bubbles are generated easily upon an abrupt change in the flow direction when liquid flows through the conduit 20, the gas bubbles that are adhered to the cover members 36 of the detection units 16a, 16b can be removed reliably.

The ultrasonic flow meter according to the present invention is not limited to the above embodiment. Various changes and modifications may be made to the embodiment without departing from the scope of the invention as set forth in the appended claims.

What is claimed is:

1. An ultrasonic flow meter that measures a flow rate of a liquid based on acoustic wave signals, comprising:
   a casing constituted from a pair of ports through which the liquid is supplied and discharged, and a conduit having a passage connected between the ports, wherein the liquid flows in the interior of the passage; and
   a pair of detection units capable of transmitting and receiving the acoustic wave signals, the detection units being disposed on opposite ends of the casing in mutual confronting relation to each other and sandwiching the passage therebetween,
   wherein the detection units are disposed on an axis of the conduit, and on outer circumferential sides of the detection units, vibration generating mechanisms are provided that impart vibrations with respect to the detection units.

2. The ultrasonic flow meter according to claim 1, wherein the vibration generating mechanisms include vibration generating bodies that generate vibrational waves under supply of electric power thereto, and which apply the vibrational waves with respect to outer circumferential surfaces of liquid contacting portions in the detection units.

3. The ultrasonic flow meter according to claim 2, wherein the vibrational waves are generated along an axial direction of the ports perpendicular to the axis of the conduit.

4. The ultrasonic flow meter according to claim 2, wherein the vibration generating bodies comprise piezoelectric elements.

5. The ultrasonic flow meter according to claim 1, wherein the conduit and the ports are formed mutually perpendicular to each other.

6. The ultrasonic flow meter according to claim 1, wherein the vibration generating mechanisms are detachably disposed with respect to the casing.

7. The ultrasonic flow meter according to claim 2, wherein the detection units comprise:
   the liquid contacting portions mounted in facing relation to the passage of the casing;
   acoustic wave transmitting and receiving units arranged in the interior of the liquid contacting portions; and
   connecting caps connected to ends of the conduit and sealing the passage.

8. The ultrasonic flow meter according to claim 4, wherein the vibration generating bodies are curved with circular-arc-like shapes in cross section corresponding to a shape of the casing.

* * * * *